United States Patent
Jackson et al.

(10) Patent No.: US 12,435,192 B2
(45) Date of Patent: *Oct. 7, 2025

(54) POLYMER COMPOSITIONS FOR EXTRUSION AND ADDITIVE MANUFACTURING PROCESSES

(71) Applicant: Airtech International, Inc., Huntington Beach, CA (US)

(72) Inventors: Aubrey Gerald Jackson, Costa Mesa, CA (US); Zachary Ian Skelton, Laguna Hills, CA (US); Philip Lunn, Warwick (GB); Guy Rene Schindler, Huntington Beach, CA (US)

(73) Assignee: AIRTECH INTERNATIONAL, INC., Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,717

(22) Filed: Mar. 14, 2024

(65) Prior Publication Data

US 2024/0262968 A1    Aug. 8, 2024

Related U.S. Application Data

(63) Continuation of application No. 17/374,848, filed on Jul. 13, 2021, now Pat. No. 11,932,737, which is a
(Continued)

(51) Int. Cl.
*B29C 48/92* (2019.01)
*B29C 48/00* (2019.01)
(Continued)

(52) U.S. Cl.
CPC ............ *C08J 5/042* (2013.01); *B29C 48/0021* (2019.02); *B29C 48/022* (2019.02); *B29C 48/03* (2019.02);
(Continued)

(58) Field of Classification Search
CPC ..... B29C 64/118; B29C 48/92; B29C 48/022; B29C 71/02; B29K 2507/04; B29K 2509/08
(Continued)

(56) References Cited

U.S. PATENT DOCUMENTS 5,071,506 A   12/1991  Nelson et al.
5,849,130 A   12/1998  Browne
(Continued)

FOREIGN PATENT DOCUMENTS

CN    107163523 A   9/2017
EP    0 311 400 A2  4/1989
(Continued)

OTHER PUBLICATIONS

Examination Report for Application No. GB2202887.2 dated Nov. 21, 2022, 5 pages.
(Continued)

*Primary Examiner* — Christina A Johnson
*Assistant Examiner* — Xue H Liu
(74) *Attorney, Agent, or Firm* — Womble Bond Dickinson (US) LLP (57) ABSTRACT

A polymer composition capable of being additively manufactured includes a polymer matrix and a magnetically receptive additive. The polymer composition may be additively manufactured or extruded to form a tool which may be used to form a composite part.

16 Claims, 2 Drawing Sheets

Related U.S. Application Data continuation of application No. 16/984,029, filed on Aug. 3, 2020, now Pat. No. 11,655,346.

(60) Provisional application No. 62/882,425, filed on Aug. 2, 2019, provisional application No. 62/882,423, filed on Aug. 2, 2019.

(51) Int. Cl.

| | | |
|---|---|---|
| *B29C 48/03* | (2019.01) | |
| *B29C 64/118* | (2017.01) | |
| *B29C 71/02* | (2006.01) | |
| *B33Y 70/10* | (2020.01) | |
| *B33Y 80/00* | (2015.01) | |
| *C08J 5/04* | (2006.01) | |
| B29K 101/00 | (2006.01) | |
| B29K 507/04 | (2006.01) | |
| B29K 509/08 | (2006.01) | |
| C08K 3/22 | (2006.01) | |
| C08K 3/28 | (2006.01) | |
| C08K 3/34 | (2006.01) | |

(52) U.S. Cl.
CPC ............ *B29C 48/92* (2019.02); *B29C 64/118* (2017.08); *B29C 71/02* (2013.01); *B33Y 70/10* (2020.01); *B33Y 80/00* (2014.12); *B29K 2101/00* (2013.01); *B29K 2507/04* (2013.01); *B29K 2509/08* (2013.01); *C08K 2003/2258* (2013.01); *C08K 3/28* (2013.01); *C08K 3/34* (2013.01); *C08K 2201/005* (2013.01)

(58) Field of Classification Search
USPC .................................................. 264/211.17
See application file for complete search history.

(56) References Cited

U.S. PATENT DOCUMENTS

| | | |
|---|---|---|
| 6,939,477 B2 | 9/2005 | Stark et al. |
| 9,259,886 B2 | 2/2016 | Matsen et al. |
| 9,833,986 B1 | 12/2017 | Susnjara |
| 2007/0135550 A1 | 6/2007 | Chakrapani et al. |
| 2011/0129640 A1 | 6/2011 | Beall et al. |
| 2014/0141168 A1 | 5/2014 | Rodgers |
| 2017/0174932 A1 | 6/2017 | Granlund et al. |
| 2017/0225394 A9 | 8/2017 | Rodgers et al. |
| 2017/0251713 A1 | 9/2017 | Warner et al. |
| 2018/0281279 A1 | 10/2018 | Barocio et al. |
| 2021/0340341 A1 | 11/2021 | Jackson et al. |

FOREIGN PATENT DOCUMENTS

| | | |
|---|---|---|
| GB | 2508378 A | 6/2014 |
| WO | WO 2009/157143 A1 | 12/2009 |
| WO | WO 2018/094185 A1 | 5/2018 |
| WO | WO 2021/026096 A1 | 2/2021 |

OTHER PUBLICATIONS

"Momenzadeh et al., Influences of zirconium tungstate additives on characteristics of polyvinylidene fluoride (PVDF) components fabricated via material extrusion additive manufacturing process, Jun. 10, 2019, The International Journal of Advanced Manufacturing Technology, vol. 103, pp. 4713-4720" (Year: 2019).

International Search Report and Written Opinion for International Application No. PCT/US20/44793, dated Oct. 4, 2020, 11 pages.

Examination Report for Application No. GB2202887.2, dated May 24, 2023, 6 pages.

FIG. 2

POLYMER COMPOSITIONS FOR EXTRUSION AND ADDITIVE MANUFACTURING PROCESSES

CROSS-REFERENCE TO RELATED APPLICATION(S)

This application is a continuation of and claims priority to and the benefit of U.S. patent application Ser. No. 17/374,848, filed Jul. 13, 2021, which is a continuation of U.S. patent application Ser. No. 16/984,029, filed Aug. 3, 2020 (now U.S. Pat. No. 11,655,346), which claims priority to and the benefit of U.S. Provisional Patent Application Ser. No. 62/882,425, filed Aug. 2, 2019, and titled "ADJUSTABLE CTE POLYMER COMPOSITIONS FOR EXTRUSION AND ADDITIVE MANUFACTURING PROCESSES," and U.S. Provisional Patent Application Ser. No. 62/882,423, filed Aug. 2, 2019, and titled "POLYMER COMPOSITIONS CAPABLE OF INDUCTION HEATING FOR EXTRUSION AND ADDITIVE MANUFACTURING PROCESSES," the entire contents of all of which are incorporated herein by reference.

BACKGROUND

Molds and cauls, among other structures, are commonly used to fabricate composite parts. These molds, cauls and other structures (also referred to herein as "tools") are typically prepared from metallic or polymeric materials. The polymeric materials often include modifications to the polymers used to make the tools. These modifications are commonly made to impart certain desired properties to the tools post-cure. For example, conventional polymeric materials for the production of these tools have included the addition of certain additives to modify the coefficient of thermal expansion (CTE), increase strength, and reduce warpage in the extruded polymers. These additives have conventionally been incorporated into the tools in fiber form, but polymer modification using fibers has certain limitations, and to date, no compositions incorporating expansion controlling fillers have been developed that are suitable for additive manufacturing and/or extrusion manufacturing processes for manufacturing the tools.

For tool manufacturing, one of the major problems with current additive manufacturing techniques is the highly anisotropic behavior of the polymers, and their lack of thermal conductivity. The highly anisotropic behavior of the polymers used in additive manufacturing techniques is a primary result of attempting to control the thermal expansion, strength, and warpage of the printed (i.e., additively manufactured) material (or structure). The polymers used in these manufacturing techniques can be modified by the addition of certain fibers to modify the coefficient of thermal expansion (CTE), increase strength, and/or reduce warpage in the extruded or printed polymer. However, in additive manufacturing processes, the addition of fibers to the polymer printing compositions results in a printed bead that has different thermal expansion properties in the print direction, across the bead width, and through the bead thickness due to the different orientations of the fibers within the polymer matrix. In fact, the inconsistent orientation of the fibers within the polymer matrix leads to significant dissimilarities in a wide variety of mechanical and thermal properties.

SUMMARY

According to embodiments of the present disclosure, a polymer composition comprises a polymer matrix and a magnetically receptive additive, and the polymer composition is configured for additive manufacturing or extrusion.

The magnetically receptive additive may include a powder or particulate having an average particle size of about 50 µm or smaller. In some embodiments, the magnetically receptive additive may include a plurality of fibers having an average fiber length of about 10 mm or smaller. According to some embodiments, the magnetically receptive additive may include a material selected from: iron; cobalt; nickel; naturally occurring minerals; rare earth metals; ferromagnetic materials; alloys thereof; oxides thereof; combinations thereof; hybrids thereof; and mixtures thereof.

In some embodiments, the magnetically receptive additive may include a substrate coated with a magnetically receptive coating material. The substrate may include a non-magnetically receptive substrate material. According to some embodiments, the non-magnetically receptive coating material may include graphite, fiberglass, aramids, combinations thereof, or mixtures thereof. The magnetically receptive substrate material may include a material selected from: iron; cobalt; nickel; naturally occurring minerals; rare earth metals; ferromagnetic materials; alloys thereof; oxides thereof; combinations thereof; hybrids thereof; and mixtures thereof.

In some embodiments, the polymer composition may also include one or more auxiliary additives. The one or more auxiliary additives may comprise one or more strengtheners, one or more thermal expansion modifiers, or one or more colorants. The one or more strengtheners may comprise a material selected from the group consisting of carbon fibers, glass fibers, aramid fibers, metal fibers, metal coated fibers, and combinations thereof.

According to some embodiments, the magnetically receptive additive may be present in the polymer composition in an amount of about 1 to about 60 vol % based on 100 vol % of the polymer composition.

In some embodiments, a tool for use in manufacturing a composite part comprises the polymer composition after additive manufacturing or extrusion. The tool may comprise the polymer composition after extrusion and have a constant cross-section. The tool may comprise the polymer composition after additive manufacturing and have a net shape or desired net shape.

According to some embodiments, a method of making a tool for use in manufacturing a composite part comprises additively manufacturing or extruding the polymer composition.

In some embodiments, a method of making a composite part comprises additively manufacturing or extruding the polymer composition to form a tool, applying a composite part composition or composite part laminate on or to the tool, and exposing the tool to sufficient heat to cure the composite part composition or composite part laminate.

According to some embodiments, a system for manufacturing a composite part comprises a tool additively manufactured or extruded from the polymer composition, a heating element, and a controller configured to cycle the heating element on and off. The system may further comprise one or more thermocouples in contact with or embedded in the tool, and in communication with the controller. The one or more thermocouples and the controller may define a continuous feedback loop in which the controller receives temperature data regarding the temperature of the tool at regular intervals, and the controller automatically cycles the heater on and off in response to the temperature data when the temperature of the tool reaches or exceeds a predetermined threshold temperature.

BRIEF DESCRIPTION OF THE DRAWINGS

The features and advantages of embodiments of the present disclosure will be better understood by reference to the following detailed description when considered in conjunction with the drawings, in which.

DETAILED DESCRIPTION

According to embodiments of the present disclosure, a polymer composition is useful for extrusion and additive manufacturing processes to produce tools satisfying the demands of the composite industry. In some embodiments, the polymer composition comprises a polymer matrix and a negative thermal expansion (NTE) additive. In some embodiments, for example, the polymer composition comprises the polymer matrix filled (e.g., uniformly filled) with the NTE additive. The NTE material may be incorporated (or dispersed) into the polymer matrix as particles or fibers (e.g., short fibers). Additionally, the dispersion (e.g., uniform dispersion) of the NTE additive in the polymer matrix prior to manufacture effectively negates (or reduces or significantly reduces) the anisotropic behavior of the composition since the NTE materials are dispersed in the polymer composition prior to additive manufacture or extrusion, resulting in a printed (or extruded) product having well-integrated NTE materials. This reduces (or significantly reduces or eliminates) the discrepancies in thermal expansion properties of the printed bead, resulting in polymer compositions uniquely suited for printing tools (e.g., meeting the standards required in the composite industry) using additive manufacturing or extrusion techniques. Additionally, as the NTE additive contracts upon exposure to heat (i.e., the NTE additive has a negative coefficient of thermal expansion (CTE)) while the polymer in the polymer composition expands (i.e., the polymer has a positive CTE), addition of the NTE additive to the polymer composition can reduce or negate expansion of the manufactured tool upon exposure to heat. Indeed, the NTE additive can either reduce the expansion (i.e., the CTE) to acceptable levels, negate the expansion altogether (e.g., produce a net-zero expansion), or even push the expansion to negative levels (i.e., produce a composition as a whole that has a negative CTE such that it contracts rather than expands on exposure to heat). This ability to tailor the thermal expansion properties (e.g., the CTE) of the manufactured tool enables the manufacturing of tools CTE-matched to the composite part fabricated using the tool.

As noted generally above, according to embodiments of the present disclosure, a polymer composition useful for the extrusion or additive manufacturing of composite tools (e.g., molds, cauls, etc.) includes a polymer matrix and an NTE additive. The polymer of the polymer matrix is not particularly limited, and may be any polymer suitable for use in extrusion and additive manufacturing techniques and processes, and similar or equivalent processes and techniques. Indeed, those of ordinary skill in the art would be capable of selecting an appropriate polymer for the polymer matrix based on the desired structure and properties of the resulting additively manufactured or extruded tool. Some nonlimiting examples of suitable polymers for the polymer matrix include fluoropolymers, ethylene-vinyl acetate (EVM) polymers, silicones, elastomers (including but not limited to thermoplastic elastomers), thermoset polymers or plastics, and thermoplastic polymers or plastics. Nonlimiting examples of suitable thermoset polymers and plastics include urethanes, vinyl esters, epoxies, bismaleimides (BMI), benzoxazines, cyanates, phenolics, and the like, including mixtures thereof, derivatives thereof, and co-polymers of two or more thereof. Nonlimiting examples of suitable thermoplastic elastomers, polymers or plastics include acrylonitrile butadiene styrene (ABS) polymer systems, polyphenylene sulfide (PPS) polymer systems, polyphenylsulfone (PPSU) polymer systems, polyetherketone (PEK) polymer systems, polyetheretherketone (PEEK) polymer systems, polyaryletherketone (PAEK) polymer systems, polyethersulfone (PES or PESU) polymer systems, polycarbonate (PC) polymer systems, polylactic acid (PLA) polymer systems, polyvinyl alcohol (PVA) polymer systems, and the like, including mixtures thereof, derivatives thereof, and co-polymers of two or more thereof.

As would be understood by those of ordinary skill in the art, the polymer matrices discussed above may be prepared in any suitable manner, using any suitable reactions and reactants. For example, in some embodiments, the polymer matrices may be thermally cured by mixing the appropriate monomers and exposing the mixture to heat sufficient to effect curing. In some embodiments, however, the polymer matrices may be chemically cured, e.g., by mixing the appropriate monomers with a hardener (or curing agent), and allowing the monomers and hardener (or curing agent) to react for a sufficient amount of time to effect cross-linking and/or curing. Suitable hardeners (or curing agents) are well known to those of ordinary skill in art, and may differ depending on the polymer matrix being prepared. Those of ordinary skill in the art would be capable of selecting an appropriate hardener (or curing agent) based on the polymer species being used to prepare the polymer matrix. The chemical curing mechanism may be particularly suitable for preparing thermoset polymer systems. In some embodiments, the polymer matrices may be prepared using a combination of thermal and chemical curing mechanisms. Also, any other known or suitable curing techniques may be used to prepare the polymer matrices, including but not limited to electron beam, ultraviolet (UV) radiation, X-ray and microwave processes.

The NTE additive is also not particularly limited, and may be any material that itself either contracts (rather than expands) upon exposure to heat (e.g., has a negative coefficient of thermal expansion (CTE)), or itself has zero or near zero thermal expansion. Indeed, as used herein, the term "negative thermal expansion additive" or "NTE additive" refers to any material that is capable of reducing the thermal expansion properties of the polymer composition, and includes those materials that reduce the thermal expansion to acceptable levels, negate the thermal expansion altogether (e.g., yield a polymer composition with net-zero thermal expansion, or bring the thermal expansion to negative levels (e.g., yield a polymer composition with negative thermal expansion such that the composition as a whole contracts on exposure to heat). With that in mind, those of ordinary skill in the art would be capable of selecting an appropriate material for the NTE additive based on the polymer in the polymer composition, and on the desired thermal expansion properties of the resulting composite tool (e.g., the desired degree of thermal expansion reduction).

Any suitable material with NTE properties may be used for the NTE additive, without limitation, and many materials with this property are known and commercially available. Any now known or hereafter developed or discovered materials with NTE properties may be used as the NTE additive, including any and all commercially available such products now or hereafter available. Some nonlimiting examples of suitable materials for the NTE include: transition metal tungstates (including, for example, zirconium tungstates (e.g., $ZrW_2O_8$), scandium tungstates (e.g., $Sc_2W_3O_{12}$), hafnium tungstates (e.g., $HfW_2O_8$, etc.)); transition metal molybdates (e.g., zirconium molybdates (e.g., $ZrMo_2O_8$), scandium molybdates (e.g., $Sc_2Mo_3O_{12}$), hafnium molybdates (e.g., $HfMo_2O_8$), etc.)); zirconium vanadates (e.g., $ZrV_2O_7$); zeolites (i.e., those exhibiting NTE); aluminum phosphates (i.e., those exhibiting NTE); Prussian blue analogs (including but not limited to transition metals, semiconductors and/or precious metal analogs of Prussian blue, including but not limited to Zn, Mn, Co, Ni, Cu, Cd, Fe, Ga, Pt, Sc and Hf analogs of Prussian blue, including, for example, $Zn_3[Fe(CN)_6]$, $Fe[Fe(CN)_6]$, $Fe_3[Co(CN)_6]$, $Ga[Fe(CN)_6]$, $M[Pt(CN)6]$ where M is Mn, Fe, Co, Ni, Cu, Zn, Cd, etc., and others); antiperovskite manganese nitrides (including but not limited to those with the structure $Mn_3MN$ in which M is a dopant, such as but not limited to one or more transition metals, semiconductors and/or precious metals, e.g., Pt, Ag, Au, Sn, Cr, Zn, Ge, Cu, Ga, Fe, Ni, Co, Cu, Cd, Fe, Sc, Hf, etc.); β-eucryptite; $BiNi_{1-x}Fe_xO_3$ compounds in which x is less than 1 and greater than 0; $Ca_2RuO_{4-y}$; combinations thereof, hybrids thereof, and mixtures thereof. Some additional nonlimiting examples of suitable NTE materials are described in U.S. Patent Publication No. 2007/0135550 to Chakrapani et al., titled "NEGATIVE THERMAL EXPANSION FILLER FOR LOW CTE COMPOSITES," and filed on Dec. 14, 2005, the entire contents of which are incorporated herein by reference. As noted above, the NTE additive is not limited to the listed materials (which are not intended to constitute an exhaustive list), and the transition metals in these species can be substituted, and hybrid species can be sintered using spark plasma sintering or other similar sintering processes. Indeed, NTE materials are the subject of constant and ongoing research, and new NTE species are being and will be discovered and developed in the future. The NTE additive according to embodiments of the present disclosure encompasses all NTE materials that are now known (including those listed above and others that are currently known) as well as those equivalents that are yet to be developed.

Additionally, the NTE additive may include a coated NTE additive in which an NTE material is coated with a coating material (which may not have NTE properties) to increase the additive's performance and/or effective bond strength in the polymer matrix. In these embodiments, the coating material is not particularly limited and may be any coating material capable of incorporation into the polymer composition (or resulting tool, as discussed further below). Some nonlimiting examples of suitable coating materials (for coating the NTE material) include any polymer compatible with the polymer matrix material, such as but not limited to polymethylpentene (PMP).

As noted above, these lists of NTE additives, coated NTE additives and coating materials are not exclusive, and as new NTE materials are developed and made available commercially, those materials are also intended to be covered by the terms "negative thermal expansion additives" or "NTE additives" or as equivalents thereof under the Doctrine of Equivalents.

In embodiments of the present disclosure, the NTE material (whether a coated additive or not) may be added, mixed, dispersed or otherwise incorporated into the polymer matrix or included in the polymer composition in any suitable form, for example powder (or particulate) form or fiber (e.g., short fiber) form. While the particle size of the powder (or particulate) and length of the fibers are not particularly limited, in some embodiments, the powder (or particulate) may have an average particle size (and the fibers may have an average fiber length) of about 50 µm or smaller, for example about 30 microns or smaller, or about 20 microns or smaller. And in some embodiments, the powder (or particulate) may have an average particle size (and the fibers may have an average length) of about 10 µm or smaller, for example, 7 µm or smaller, 5 µm or smaller, or about 3 µm to about 5 µm. Additionally, the lower limit of the particle size (or fiber length) is not particularly limited. However, in some embodiments, the powder (or particulate) may have an average particle size (and the fibers may have an average length) of about 1 µm or greater, e.g., about 1 µm to about 50 µm, about 1 µm to about 30 microns, about 1 µm to about 20 microns, about 1 µm to about 10 µm, about 1 µm to about 7 µm, or about 1 µm to about 5 µm.

In some embodiments in which the NTE additive is included in the polymer composition in fiber (or short fiber) form, the fibers may have the lengths discussed above. However, in some embodiments, the fibers may be longer, for example, 10 mm or shorter, for example 5 mm or shorter, or 3 mm or shorter. Indeed, the length of the fibers (or short fibers) is not particularly limited as long as the fibers can be effectively incorporated into the polymer composition, and as long as the resulting polymer composition can be used in additive manufacturing or extrusion techniques. Additionally, when the NTE additive is included in the polymer composition as fibers, the fibers may be damaged during the extrusion or additive manufacturing process. Accordingly, the fibers existing in the manufactured tool (resulting from the additive manufacturing or extrusion (and curing) of the polymer composition) may have average lengths (or short dimensions) that are shorter than the average lengths of the fibers mixed or compounded in the polymer composition prior to the additive manufacturing or extrusion process. The individual fibers may be damaged differently during the manufacturing process, and the damage to the fibers may differ from run to run in the manufacturing process, and may differ in different manufacturing processes (e.g., the damage caused during extrusion may be different than the damage caused during additive manufacturing). As such, the average length of the fibers in the manufactured tool may differ depending on the additive manufacturing or extrusion process employed to make the tool, the conditions of the manufacturing process, and the composition of the fibers and the polymer composition. In some embodiments, however, the fibers in the manufactured tool may have an average length (or long dimension) of about 5 mm or shorter, for example, about 2.5 mm or shorter, or about 1.5 mm or shorter.

As used herein, the terms "fiber" and "short fiber" denote an elongated structure in which a length (or long) dimension is larger (or longer) than a width (or short) dimension. As such, while the length (or long dimension) of the fibers may fall within the ranges discussed above, the width (or short dimension) of the fibers may be shorter (or significantly shorter) than the length. By incorporating the NTE material into the polymer matrix in particulate or fiber (or short fiber) form, the smaller dimensions of the particles or fibers of the NTE additive particles enable negation (or reduction/minimization) of the anisotropic behavior of the manufactured tool.

The amount, ratio and/or proportions of the polymer matrix and the NTE additive are not particularly limited, and may have any value so long as the resulting polymer composition remains suitable for the intended manufacturing process (e.g., extrusion or additive manufacturing) and capable of use in the fabrication of composite parts. Indeed, in some embodiments, the amount, ratio and/or proportions of the polymer matrix and NTE additive are tailored or selected to achieve the desired or target expansion properties in the manufactured tool. Indeed, the amount, ratio and/proportions of the polymer matrix and the NTE additive (as well as the selection of the NTE additive material) may differ depending on the polymer selected for the polymer matrix (and that polymer's thermal expansion properties), the desired thermal expansion properties of the manufactured tool (e.g., negative thermal expansion such that the tool contracts within acceptable tolerances upon exposure to heat, net-zero thermal expansion such that the tool neither expands nor contracts upon exposure to heat, or positive (but reduced) thermal expansion such that the tool expands within acceptable tolerances upon exposure to heat), and the thermal expansion properties of the composite part intended to be fabricated using the tool.

Accordingly, in some embodiments, the amount, ratio and/or proportions of the polymer matrix and the NTE additive may be used to tailor the polymer compositions for different purposes or materials. For instance, the amount, ratio and/or proportions of the polymer matrix and the NTE additive may differ depending on the type of polymer and NTE additive used in the polymer composition. As such, different combinations of polymers and NTE additives may have different amounts, ratios and/or proportions of the polymer and NTE additive in order to achieve the desired properties in the resulting printed or extruded tool. For example, certain polymers (e.g., polyphenylene sulfides) may require larger amounts of NTE additive in order to meaningfully affect the thermal expansion properties of the polymer composition, and the amounts of NTE additive needed for amorphous materials is lower (or significantly lower) than that the amounts needed for semi-crystalline materials). Indeed, the amount, proportions and/or ratios of the NTE additive and polymer may be selected or tailored to match the CTE of the manufactured tool to the CTE of the composite part intended to be fabricated using the tool. As different composite parts may have different compositions and different CTEs (e.g., carbon fiber reinforced composites typically have a CTE of 2 to 3 ppm/C, glass reinforced composites typically have a CTE of 10-14 ppm/C, and aramid reinforced composites typically have a CTE of 6 to 8 ppm/C), such CTE-matching can ensure that any expansion upon exposure to heat is consistent within the tool and the composite part being fabricated using the tool.

In some embodiments, for example, the polymer matrix may be present in the polymer composition in an amount of about 40 to about 99 vol % (based on the total volume of the polymer composition), for example, about 40 to about 94 vol % (based on the total volume of the polymer composition). And the NTE additive may be present in the polymer composition in an amount of about 1 to about 60 vol % (based on the total volume of the polymer composition), for example, about 1 to about 30 vol % (based on the total volume of the polymer composition), or about 1 to about 15 vol % (based on the total volume of the polymer composition).

In addition to the polymer matrix and the NTE additive, in some embodiments, the polymer composition may further include a variety of different auxiliary additives. The auxiliary additives are not particularly limited, and may include any materials capable of modifying a desired or selected property of the polymer composition (and consequently, a desired or selected property of the tool resulting from the additive manufacturing or extrusion process). Some nonlimiting examples of suitable such auxiliary additives include strengtheners, magnetically receptive materials, and colorants. The strengtheners may be any suitable material capable of enhancing the mechanical strength of the additively manufactured or extruded tool. Nonlimiting examples of suitable strengtheners include fibers, such as, but not limited to carbon fibers, glass fibers, aramid fibers, metal fibers and metal coated fibers (e.g., metal coated carbon, glass or aramid fibers). These fibers may have any suitable shape and/or size, including an average length dimension similar to that of the fibers discussed above in connection with the NTE additive. When included in the polymer composition, a single type of strengthener may be used, or a combination of two or more different types of strengtheners may be used, without limitation. Also, the amount of the strengthener(s) in the polymer composition is not particularly limited, and may be any amount suitable to achieve the desired strengthening effect. As the desired strength of the additively manufactured or extruded tool may differ depending on the intended application of the tool, the amount of the strengthener may be tailored or selected based on the intended application of the tool. And those of ordinary skill in the art would be capable of selecting an appropriate amount of the strengthener in the polymer composition based on the intended application of the manufactured tool and the desired strength of that tool for the intended application. In some embodiments, for example, the strengthener (such as, but not limited to, carbon fibers) may be included in the polymer composition in an amount of about 1 to about 30 vol % (based on the total volume of the polymer composition), for example, about 5 to about 30 vol % (based on the total volume of the polymer composition), about 1 to about 20 vol % (based on the total volume of the polymer composition), or about 5 to about 20 vol % (based on the total volume of the polymer composition).

Additionally, in some embodiments, the strengtheners discussed above may also serve as secondary thermal expansion modifiers. For example, in embodiments including carbon fibers as a strengthener, the carbon fibers may also have an effect on the thermal expansion properties of the polymer composition (e.g., on the coefficient of thermal expansion (CTE)), and of the additively manufactured or extruded tool. As the desired thermal expansion properties (and thus the amount or degree of modification needed or desired) of the additively manufactured or extruded tool may differ depending on the intended application of the tool (as discussed above), the amount of the strengtheners (e.g., those doubling as a secondary thermal expansion modifier) may be tailored or selected based on the intended application of the tool, and on the selected NTE additive and amount of that additive. And those of ordinary skill in the art would be capable of selecting an appropriate amount of the strengthener (e.g., one doubling as a secondary thermal expansion modifier) in the polymer composition based on the intended application of the manufactured tool, the desired thermal expansion properties of that tool (e.g., positive, net-zero, or negative expansion) for the intended application, and on the composition and amount of the NTE additive in the polymer composition.

The magnetically receptive material may be any material that is magnetically receptive or otherwise capable of induction heating. Indeed, as used herein, the term "magnetically receptive material" refers to any material that is capable of generating eddy currents in the material in response to an alternating magnetic field. The eddy currents generated in the magnetically receptive material generate heat within the additive which is then dissipated to the polymer matrix, throughout the tool manufactured using the polymer composition, and to the composite part being cured on the tool. With that in mind, those of ordinary skill in the art would be capable of selecting an appropriate material for the magnetically receptive additive based on the polymer in the polymer composition, and on the desired magnetic and induction heating properties of the resulting composite tool (e.g., the desired efficiency, rate or amount of heating). Nonlimiting examples of suitable magnetically receptive materials include those described in U.S. Provisional Application No. 62/882,423, titled "POLYMER COMPOSITIONS CAPABLE OF INDUCTION HEATING FOR EXTRUSION AND ADDITIVE MANUFACTURING PROCESSES," filed on Aug. 2, 2019 in the name of Airtech International, Inc. to which this application claims priority, the entire content of which is incorporated herein by reference, and was attached as Appendix A to U.S. Provisional Application 62/882,425 to which this application claims priority.

The inclusion of a magnetically receptive material in the polymer composition provides unique "self-heating" properties to the manufactured tool. As used herein, the term "self-heating" references the capability of the manufactured tool to be heated by induction. Details and benefits of this "self-heating" property, as well as systems and methods of using a manufactured tool having this property are also described in U.S. Provisional Application No. 62/882,423, titled "POLYMER COMPOSITIONS CAPABLE OF INDUCTION HEATING FOR EXTRUSION AND ADDITIVE MANUFACTURING PROCESSES," filed on Aug. 2, 2019 in the name of Airtech International, Inc. to which this application claims priority, the entire content of which is incorporated herein by reference and was attached as Appendix A to U.S. Provisional Application No. 62/882,425 to which this application claims priority.

Additionally, the colorant may be any suitable material capable of imparting the desired color to the additively manufactured or extruded tool. The addition of colorants to polymer compositions used in additive manufacturing and extrusion processes is well known to those of ordinary skill in the art, and any colorants may be used, which materials are also known to those of ordinary skill in the art. When included in the polymer composition, a single type of colorant may be used, or a combination of two or more different types of colorants may be used to achieve the desired color, without limitation. Also, the amount of the colorant(s) in the polymer composition is not particularly limited, and may be any amount suitable amount to achieve the desired color in the additively manufactured or extruded tool. As the amount of colorant needed to achieve the desired color of the additively manufactured or extruded tool may differ depending on the remaining components of the polymer composition, the amount of colorant may be tailored or selected based on the polymer composition and the desired color of the manufactured tool. Those of ordinary skill in the art would be capable of selecting an appropriate amount of an appropriate colorant based on the composition of the polymer composition and the desired color of the manufactured tool. In some embodiments, for example, the colorant may be included in the polymer composition in an amount of about 0.1 to about 10 vol % (based on the total volume of the polymer composition).

In embodiments including an auxiliary additive, the polymer composition may include a single type of auxiliary additive or a combination of two or more different types of auxiliary additives. When the polymer composition includes more than one type of auxiliary additive (e.g., both a strengthener and a magnetically receptive material, or all three of a strengthener, magnetically receptive material and colorant), each of the different auxiliary additives may be independently included in the polymer composition in an amount of about 1 to about 30 vol % based on the total volume of the polymer composition (or about 0.1 to about 10 vol % for the colorant). Alternatively, in some embodiments, the sum total of the amounts of all auxiliary additives in the polymer composition may be about 1 to about 60 vol % (based on the total volume of the polymer composition), or about 1 to about 30 vol % (based on the total volume of the polymer composition). In embodiments in which the sum total of the different types of auxiliary additives is about 1 to about 60 vol %, or about 1 to about 30 vol % (based on the total volume of the polymer composition), the ratio and/or proportions of the different auxiliary additives is not particularly limited. For example, the different auxiliary additives may be included in equal or unequal amounts, which may be tailored as discussed above to achieve the desired effect (e.g., the desired, strength, color, "self-heating," and/or thermal expansion properties).

Additionally, in some embodiments, when the polymer composition includes one or more auxiliary additives, the total amount of all additives in the polymer composition (e.g., the sum total of the amount of the NTE additive and all auxiliary additives) may be about 1 to about 60 vol % (based on the total volume of the polymer composition), about 1 to about 50 vol % (based on the total volume of the polymer composition), about 1 to about 40 vol % (based on the total volume of the polymer composition), about 1 to about 35 vol % (based on the total volume of the polymer composition), or about 1 to about 30 vol % (based on the total volume of the polymer composition). As noted above, in embodiments in which the sum total of the NTE additive and the different types of auxiliary additives is about 1 to about 60 vol %, about 1 to about 50 vol %, about 1 to about 40 vol %, about 1 to about 35 vol %, or about 1 to about 30 vol %, the ratio and/or proportions of the NTE additive and different auxiliary additives is not particularly limited. For example, the NTE additive may still be included in an amount within the ranges discussed above in connection with the NTE additive, and the NTE additive and different auxiliary additives may be included in equal or unequal amounts, which may be tailored as discussed above to achieve the desired effect (e.g., the desired, strength, color, "self-heating," and/or thermal expansion properties).

The polymer compositions disclosed herein may be made by any suitable mixing or compounding technique, without limitation. Indeed, any mixing or compounding technique currently known in the art or hereafter developed (e.g., known techniques for mixing/compounding thermosets and thermoplastics) may be used to prepare the polymer compositions described herein. By way of nonlimiting example, for instance, a twin screw extruder may be used for even mixing of the components at the proper melting temperature and shear rate, which melting temperature and shear rate would be easily discernable by those of ordinary skill in the art based on the polymer used in the polymer composition. As another nonlimiting example, the components of the polymer composition may simply be mixed together at the appropriate melting temperature, which melting temperature would be easily discernable by those of ordinary skill in the art based on the polymer used in the polymer composition.

As discussed above, the polymer compositions disclosed herein are configured for use in additive manufacturing and extrusion processing techniques to form cured structures that can serve as molds, cauls, bladders, intensifiers, etc. for the fabrication of composite parts. The cured structures (e.g., molds, cauls, bladders, intensifiers, etc.) made from the additive manufacturing or extrusion processes are configured to be capable of heating to sufficient temperatures to cure a composite part composition or laminate. The cured structures may be heated in any suitable manner, including but not limited to heating the tool and the applied composite part composition (or laminate) in an oven or autoclave under vacuum conditions (e.g., in a vacuum bag), employing heater packs, resistive circuits (e.g., as described in U.S. Patent Publication No. 2018/0281279 to Barocio, et al., titled "METHODS AND APPARATUS FOR EMBEDDING HEATING CIRCUITS INTO ARTICLES MADE BY ADDITIVE MANUFACTURING AND ARTICLES MADE THEREFROM," and filed on Mar. 28, 2018, the entire content of which is incorporated herein by reference), channeled fluids, air induction, etc. In some embodiments, the cured structures may be configured for induction heating, by, for example, the application of a heating blanket (e.g., as described in U.S. Pat. No. 9,259,886 to Matsen et al., titled "CURING COMPOSITES OUT-OF-AUTOCLAVE USING INDUCTION HEATING WITH SMART SUSCEPTORS," and filed on Sep. 29, 2011), the entire content of which is incorporated herein by reference), or the inclusion of the magnetically receptive material as an auxiliary additive, as discussed above and in more detail in U.S. Provisional Application No. 62/882,423, titled "POLYMER COMPOSITIONS CAPABLE OF INDUCTION HEATING FOR EXTRUSION AND ADDITIVE MANUFACTURING PROCESSES," filed on Aug. 2, 2019 in the name of Airtech International, Inc. to which this application claims priority, the entire content of which is incorporated herein by reference and was attached as Appendix A to U.S. Provisional Application No. 62/882,425 to which this application claims priority. Regardless of the heating method, however, the heat generated in the manufactured tool transfers to the composite part composition (or laminate) coated (or placed) on the tool surface, thereby curing the composition (or laminate) and completing manufacture of the composite part.

As discussed herein, the polymer compositions disclosed herein, including the NTE material (and sometimes other auxiliary additives) in the polymer matrix enable tailoring of the CTE of the cured structures (e.g., molds, cauls, bladders, intensifiers, etc.). Indeed, comparing the CTE achieved by polymer compositions including varying amounts (i.e., 5 vol %, 10 vol % and 15 vol %) of an example NTE additive (i.e., scandium molybdates) in an example polymer system (i.e., ABS) that also includes 20 vol % carbon fibers (as an example auxiliary additive, i.e., a strengthener), it was found that the CTE of the polymer composition could be adjusted from 135 ppm/C (or higher) down to very low levels (e.g., near zero, or below 5 ppm/C) by adjusting the volume percent of the NTE material (and leaving the amount of the carbon fibers constant). As can be seen from this comparison, adjusting the amount of the NTE material in the polymer compositions enables tailoring of the CTE of the composition, as discussed herein.

As would be appreciated by those of ordinary skill in the art, and as discussed generally above, the amount of the NTE needed to accomplish a desired CTE may differ depending on the type of polymer used in the composition, and/or on the type and amount of any auxiliary additives in the composition. Additionally, the amount of the NTE additive may differ depending on the desired CTE of the composite part being manufactured using the tool made from the polymer composition. For example, in some embodiments, polymer compositions used to make tools intended for use in fabrication fiberglass or aramid based composite parts may require less of the NTE additive (compared to compositions used to make tools intended for use in fabricating carbon fiber composite parts) to achieve the desired CTE (i.e., a CTE matched or generally matched to the desired CTE of the composite part). And in some embodiments, polymer compositions used to make tools intended for use in fabricating aramid based composite parts may require more of the NTE additive (compared to compositions used to make tools intended for use in fabricating fiberglass based composite parts) to achieve the desired CTE match.

For instance, in some embodiments in which the composite part being fabricating is aramid based, the polymer composition used to make the tool for fabricating the aramid based composite part may include about 15 to about 40 vol % of the NTE additive, or about 20 to about 30 vol %, or about 25 to about 30 vol %, based on 100 vol % of the polymer composition. In addition, the NTE additive may be included at any value within any of these ranges, and within any sub-range within these ranges, without limitation. For example, the NTE additive may be included in an amount of about 15 vol %, 18, vol %, 20 vol %, 24 vol %, 28 vol %, 30 vol %, 34 vol %, 38 vol % or 40 vol % based on 100 vol % of the polymer composition.

Also, in some embodiments in which the composite part being fabricating is fiberglass based, the polymer composition used to make the tool for fabricating the fiberglass based composite part may include about 10 to about 30 vol % of the NTE additive, or about 10 to about 25 vol %, or about 15 to about 25 vol %, or about 15 to about 20 vol %, based on 100 vol % of the polymer composition. In addition, the NTE additive may be included at any value within any of these ranges, and within any sub-range within these ranges, without limitation. For example, the NTE additive may be included in an amount of about 10 vol %, 12 vol %, 14 vol %, 16 vol %, 18 vol %, 20 vol %, 22 vol %, 24 vol %, 26 vol %, 28 vol % or 30 vol %, based on 100 vol % of the polymer composition.

And in some embodiments in which the composite part being fabricating is carbon fiber based, the polymer composition used to make the tool for fabricating the carbon fiber based composite part may include about 20 to about 60 vol % of the NTE additive, or about 20 to about 50 vol %, or about 30 to about 50 vol %, or about 35 to about 45 vol %, based on 100 vol % of the polymer composition. In addition, the NTE additive may be included at any value within any of these ranges, and within any sub-range within these ranges, without limitation. For example, the NTE additive may be included in an amount of about 20 vol %, 25 vol %, 30 vol %, 35 vol %, 40 vol %, 45 vol %, 50 vol %, 55 vol % or 60 vol %, based on 100 vol % of the polymer composition.

In some embodiments, a method of fabricating a tool (e.g., a mold, caul, bladder, intensifier, etc.) includes forming the tool by additive manufacturing or extrusion using the polymer composition according to embodiments of the present disclosure. The method may further include first preparing the polymer composition including the NTE additive by any suitable technique, as discussed above. The additive manufacturing and extrusion processes for forming the tool are not particularly limited and may include any known or hereafter developed additive manufacturing and extrusion techniques. For example, in some embodiments the additive manufacturing technique may include extrusion, 3D printing, fused deposition modeling, fused filament fabrication, powder bed fusion, molten polymer deposition, photopolymerization, directed energy deposition, sheet lamination, material jetting or binder jetting, etc. In some embodiments, and where necessary based on the manufacturing technique employed to additively manufacture or extrude the tool, the method may further include curing the polymer composition after extrusion or additive manufacturing.

As would be understood by those of ordinary skill in the art, extrusion and additive manufacturing processes create a three-dimensional object by layer-after-layer deposition of the "printing" composition. The polymer compositions discussed herein may be used as the "printing" compositions in any of these extrusion and additive manufacturing processes. For example, as shown generally (and by way of example only, without limitation) in FIGS. 1 and 1A, an extruder 10 (or other additive manufacturing device) extrudes multiple layers 12 of the molten polymer composition through the extruder nozzle 14. The extruder 10 continues forming layers 12 of the polymer composition on top of each other until the object is complete. According to embodiments of the present disclosure, the layers 12 of the polymer compositions include NTE materials 16 embedded in the polymer matrix 22. And in some embodiments, the polymer compositions also include embedded fiber additives 18 (e.g., carbon fibers or other additives), and optionally, additional auxiliary additives 20 (e.g., colorants, etc.). In the layers depicted in the exploded view of FIG. 1A, the NTE materials 16, fiber additives 18 (e.g., carbon fibers) and other auxiliary additives 20 are embedded randomly in the extruded layers 12 of the composition. Indeed, as shown in FIG. 1A, the NTE materials 16 and auxiliary additives 18 are generally uniformly dispersed within the layers 12.

In some embodiments, the tool manufacturing process may vary significantly when the polymer composition includes a thermoset polymer versus a thermoplastic polymer. For example, when the polymer composition is prepared by a chemical curing mechanism (e.g., when the polymer matrix includes a thermoset polymer), the NTE additive and any auxiliary additives may be mixed into the polymer composition in any suitable manner, e.g., by either mixing them into the monomer mixture or into the hardener (or curing agent) before mixing the two components (i.e., the monomer mixture and hardener component) together and printing the polymer composition. The separate components of the polymer mixture (i.e., the monomer mixture and the hardener component) can be combined in any suitable manner using any suitable equipment, such as but not limited to using a static mixer, or mixing by hand (e.g., using available scales and mixing equipment). Methods of mixing the separate polymer composition components are well known to those of ordinary skill in the art, and those ordinary artisans would be capable of selecting an appropriate mixing technique based on the selected components of the polymer composition. The separate components of the polymer composition (i.e., the monomer component which may include all or a portion of the additives, and the hardener component which may include all or a portion of the additives) may then be combined to form the polymer composition using any known or suitable mixing or combination technique. In some embodiments, however, the monomer component, additives and hardener component are all mixed together by any suitable technique to form a self-contained polymer composition.

In some embodiments, the polymer composition (i.e., either the combined monomer component and hardener component, or the self-contained polymer composition) may be pre-heated to prepare the composition for further processing. Once mixed and/or pre-heated, the polymer composition may be pumped to the printing component of the selected additive manufacturing equipment (e.g., a print head) in the mixed state, thereby enabling the composition to be printed. Additionally, when a thermoset polymer is used as the polymer matrix, and when the polymer composition includes the magnetically receptive material as an auxiliary additive, the mixed and/or pre-heated polymer composition can be cured (or partially cured) concurrently with printing by exposure to induction heating at the printing component (e.g., the print head). More specifically, exposing the polymer composition to the induction heating at the printing component elevates the temperature of the polymer composition, thereby advancing the curing reaction without the need for highly exothermic curing reactions. Indeed, conventional methods of additive manufacturing rely on highly exothermic reactions to quickly advance the cross-linking in the polymer and cure the bead to a point sufficient to allow another layer to be deposited on top of the bead. However, according to embodiments of the present disclosure including the magnetically receptive material in the polymer composition, the bead can be more rapidly cured by induction heating, which allows different resin systems to be used (which don't rely on highly exothermic reactions for cure). This broadly extends the range of thermosets that can be used with additive manufacturing.

As generally noted above, the polymer compositions disclosed herein are additively manufactured or extruded to form a tool or cured structure (e.g., a mold, caul, bladder, intensifier, etc.). This tool may be used to fabricate composite parts for various different purposes (e.g., the manufacture of composite parts for the aerospace industry). According to some embodiments, the tool includes a cured polymer matrix with NTE particles (or fibers) dispersed throughout the matrix. The cured polymer matrix with the dispersed NTE particles (or fibers) is prepared by additive manufacturing or extrusion techniques using the polymer compositions disclosed herein. Therefore, the cured polymer matrix is the cured form of the polymer matrix materials discussed above in connection with the polymer compositions. Similarly, the NTE particles (or fibers) are the particles (or fibers) of the NTE additive (also described above) that become dispersed throughout the polymer matrix during the additive manufacturing or extrusion process. As would be understood by those skilled in the art, the amount of the NTE particles (or fibers) in the cured polymer matrix (relative to the amount of the polymer) can be calculated from the above described volume percentages of the NTE additive and the polymer materials in the polymer composition using the densities and molecular weights of the polymer and additive materials.

The tool may have any desired shape or structure. Indeed, one of the advantages of using an additive manufacturing technique is the ability to generate complex tool structures. In some embodiments, however, the tool has a substantially or generally constant shape, including a substantially or generally constant cross-sectional shape throughout the tool. Tools having such a constant cross-sectional shape may be manufactured by extrusion techniques and may be used for various purposes, such as, but not limited to seals, intensifiers, internally molded components, etc. In some embodiments, the tools (e.g., molds, cauls, mandrels, bladders, etc.) may be manufactured by an additive manufacturing technique to have more complex structures, such as, but not limited to net shapes. Additionally or alternatively, the shapes achieved by either the additive manufacturing technique or the extrusion technique can be further processed (after the additive manufacturing or extrusion), e.g., by machining, to form more complex final shapes.

According to some embodiments, a method of manufacturing a composite part includes coating, placing or otherwise applying a composite part composition or laminate on or to a tool (e.g., a mold, caul, bladder, intensifier, etc.), and exposing the tool to heat sufficient to cure the composite part composition or laminate. The tool may be any of the tools additively manufactured or extruded from the polymer compositions, as described herein. The composite part composition or laminate is not particularly limited, and may have any suitable composition and structure. Indeed, compositions and structures (e.g., laminate structures) for composite parts are well known in the industry, and those of ordinary skill in the art would be capable of selecting an appropriate composite part composition or laminate structure based on the desired structure of the cured composite part and the intended application or use for the composite part.

As discussed above, the tool may be heated in any suitable manner (e.g., in an oven or autoclave under vacuum conditions, with heater packs, resistive circuits, etc.). In embodiments in which the polymer composition includes the magnetically receptive material as an auxiliary additive, however, exposing the tool to heat may include exposing the tool to an alternating magnetic field to induce eddy currents in the magnetically receptive material. This method, as well as systems and methods for controlling the amount of heat generated in the magnetically receptive material are described in detail in U.S. Provisional Application No. 62/882,423 titled "POLYMER COMPOSITIONS CAPABLE OF INDUCTION HEATING FOR EXTRUSION AND ADDITIVE MANUFACTURING PROCESSES," filed on Aug. 2, 2019 in the name of Airtech International, Inc. to which this application claims priority, the entire content of which is incorporated herein by reference and was attached hereto as Appendix A to U.S. Provisional Application No. 62/882,425 to which this application claims priority.

Figure 1:
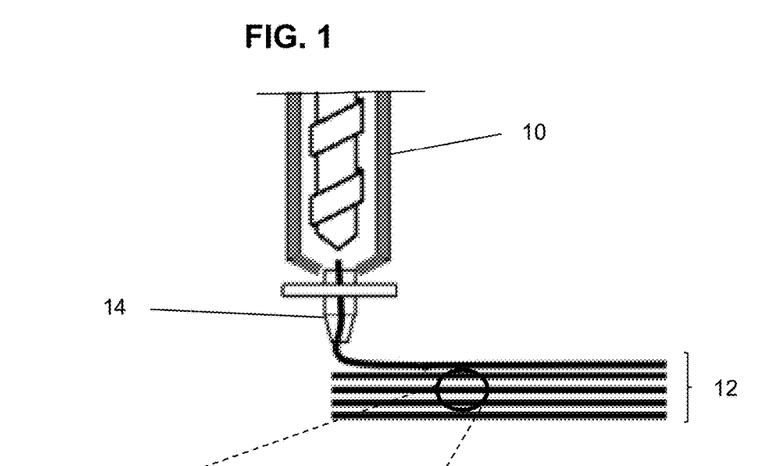
FIG. 1 is a schematic view of an extruder printing multiple layers of a polymer composition according to embodiments of the present disclosure.
Figure 1A:
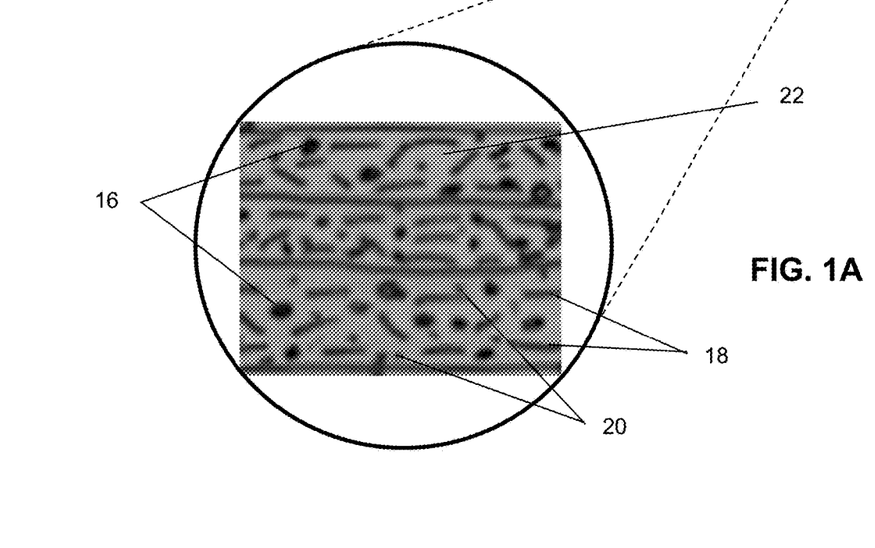
FIG. 1A is an exploded out schematic view of the multiple layers of FIG. 1 showing the distribution of various additives and fillers in the polymer composition according to embodiments of the present disclosure.
Figure 2:
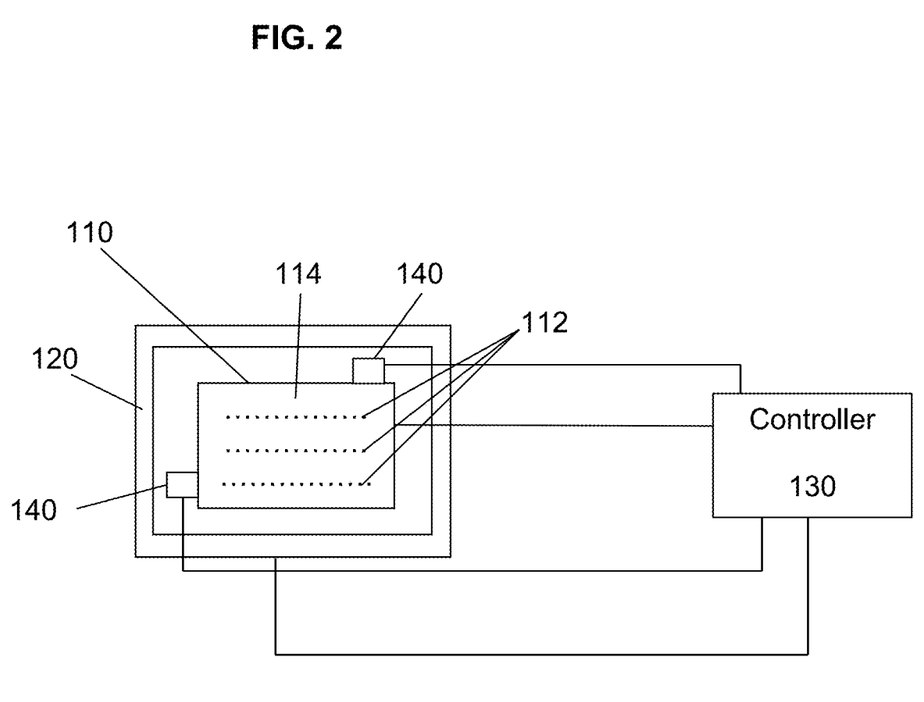
FIG. 2 is a schematic diagram of a system for manufacturing a composite part, according to embodiments of the present disclosure.

According to some embodiments of the present disclosure, as shown in FIG. 1, a system 100 for manufacturing a composite part includes a tool 110 (e.g., a mold, caul, bladder, intensifier, etc.), a heating element 120, and a controller 130 (e.g., a PID controller) for cycling the heating element 120 on and off. The tool 110 is the additively manufactured or extruded tool including NTE particles (or fibers) 112 dispersed throughout a cured polymer matrix 114 of the tool structure. The heating element 120 may be any suitable heating element capable of the tool 110 to a temperature sufficient to cure the composite composition or laminate applied to the surface of the tool. For example, in some embodiments, the heating element 120 may be an oven, auto-clave, heating blanket, etc. In embodiments in which the tool 110 includes magnetically receptive particles (or fibers or wires), the heating element 120 may be replaced with a magnetic field generator, as discussed in detail in U.S. Provisional Application No. 62/882,423 titled "POLYMER COMPOSITIONS CAPABLE OF INDUCTION HEATING FOR EXTRUSION AND ADDITIVE MANUFACTURING PROCESSES," filed on Aug. 2, 2019 in the name of Airtech International, Inc. to which this application claims priority, the entire content of which is incorporated herein by reference and was attached hereto as Appendix A to U.S. Provisional Application No. 62/882,425 to which this application claims priority.

The controller 130 may be any suitable controller (for example a PID controller) capable of cycling or switching the heating element 120 on and off. In some embodiments, the system 100 may also include one or more thermocouples 140 in contact with, permanently connected to, or embedded within the tool 110. The thermocouples 140 are also in communication with the controller 130. The thermocouples 140 together with the controller 130 may define a continuous feedback loop that continuously detects the temperature of the tool 110 at regular intervals (using the thermocouples 140), and automatically cycles the heating element 120 on or off in response to the temperature data from the thermocouples (using the controller) when the temperature of the tool reaches or exceeds a predetermined threshold temperature. The predetermined threshold temperature is not particularly limited, and may be any temperature suitable to prevent the tool from melting or failing in response to excess heat generation. For example, the predetermined threshold temperature may be set at the Tg, softening or melting point of the polymer matrix. However, in some embodiments, the predetermined threshold temperature is set at a temperature below the Tg, softening or melting point of the polymer in order to prevent tool failure. For example, in some embodiments, the predetermined threshold temperature is set at least 10° C., at least 20° C., at least 30° C., or at least 50° C. below the Tg, softening or melting point of the polymer.

Although various embodiments of the disclosure have been described, additional modifications and variations will be apparent to those skilled in the art. For example, the compositions may have additional components, which may be present in various suitable amounts, for example, other additives suitable to improve and/or modify the properties of the polymer compositions or resulting tools. Similarly, the methods of preparing the polymer compositions, tools or composite parts as described herein by way of example embodiments may be modified in accordance with the knowledge in the field to which the various embodiments pertain. For example, the methods may include additional actions or steps, may be performed at various temperatures and speeds, and/or may be otherwise suitably modified (e.g., as described with reference to the polymer compositions). As such, the disclosure is not limited to the embodiments specifically disclosed, and the compositions, systems and methods may be modified without departing from the disclosure.

Throughout the text and claims, any use of the word "about" reflects the penumbra of variation associated with measurement, significant figures, and interchangeability, all as understood by a person having ordinary skill in the art to which this disclosure pertains. Further, when used herein, the terms "substantially" and "generally" are used as terms of approximation and not as terms of degree, and are intended to account for normal variations and deviations in the measurement or assessment associated with the compositions, systems, and methods (e.g., in the description of physical or chemical properties of various components or compositions and in the description of amounts of various components).

What is claimed is:

1. A method of making a composite part, the method comprising:
   additively manufacturing or extruding a polymer composition to form a tool, the polymer composition comprising a polymer matrix and a negative thermal expansion (NTE) additive;
   applying a composite part composition or composite part laminate on or to the tool; and
   exposing the tool to sufficient heat to cure the composite part composition or composite part laminate,
   wherein the polymer composition further comprises a magnetically receptive additive, and
   wherein the magnetically receptive additive comprises a substrate coated with a magnetically receptive coating material.

2. The method of claim 1, wherein the substrate comprises a non- magnetically receptive substrate material.

3. The method of claim 2, wherein the non-magnetically receptive substrate material comprises graphite, fiberglass, aramids, combinations thereof, or mixtures thereof.

4. The method of claim 1, wherein the magnetically receptive coating material comprises a material selected from the group consisting of: iron; cobalt; nickel; naturally occurring minerals; rare earth metals; ferromagnetic materials; alloys thereof; oxides thereof; combinations thereof; hybrids thereof; and mixtures thereof.

5. The method of claim 1, wherein the polymer composition comprises one or more strengtheners selected from the group consisting of carbon fibers, glass fibers, aramid fibers, metal fibers, metal coated fibers, and combinations thereof.

6. The method of claim 1, wherein the magnetically receptive additive is present in the polymer composition in an amount of about 1 to about 60 vol % based on 100 vol % of the polymer composition.

7. The method of claim 1, wherein the NTE additive comprises a powder or particulate having an average particle size of about 10 µm or smaller.

8. The method of claim 1, wherein the NTE additive comprises a material selected from the group consisting of: transition metal tungstates; transition metal molybdates; zirconium vanadates; zeolites exhibiting NTE; aluminum phosphates exhibiting NTE; Prussian blue analogs; antiperovskite manganese nitrides; β-eucryptite; $BiNi_{1-x}Fe_xO_3$ compounds in which x is less than 1 and greater than 0; $Ca_2RuO_{4-y}$; combinations thereof, hybrids thereof, and mixtures thereof.

9. The method of claim 1, wherein the NTE additive comprises one or more transition metal tungstates, one or more antiperovskite manganese nitrides, β-eucryptite, a combination thereof, a hybrid thereof, or a mixture thereof.

10. The method of claim 1, wherein the polymer composition further comprises one or more auxiliary additives.

11. The of claim 10, wherein the one or more auxiliary additives comprises one or more strengtheners, one or more magnetically receptive materials, or one or more colorants.

12. The method of claim 11, wherein the one or more strengtheners comprises a material selected from the group consisting of carbon fibers, glass fibers, aramid fibers, metal fibers, metal coated fibers, and combinations thereof.

13. The method of claim 1, wherein the NTE additive is present in the polymer composition in an amount of about 1 to about 60 vol % based on 100 vol % of the polymer composition.

14. The method of claim 1, wherein the magnetically receptive additive comprises a powder or particulate having an average particle size of about 50 µm or smaller.

15. The method of claim 1, wherein the magnetically receptive additive comprises a plurality of fibers having an average fiber length of about 10 mm or smaller.

16. The method of claim 1, wherein the magnetically receptive additive comprises a material selected from the group consisting of: iron; cobalt; nickel; naturally occurring minerals; rare earth metals; ferromagnetic materials; alloys thereof; oxides thereof; combinations thereof; hybrids thereof; and mixtures thereof.

* * * * *